US006779195B2

United States Patent
Oishi et al.

(10) Patent No.: US 6,779,195 B2
(45) Date of Patent: Aug. 17, 2004

(54) SIGNAL PROCESSING APPARATUS AND SIGNAL RECEIVING APPARATUS

(75) Inventors: Katsumi Oishi, Tokyo (JP); Masakatsu Toyoshima, Kanagawa (JP); Keiji Fukuzawa, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/326,954

(22) Filed: Jun. 7, 1999

(65) Prior Publication Data

US 2003/0133051 A1 Jul. 17, 2003

(30) Foreign Application Priority Data

Jun. 9, 1998 (JP) .......................................... 10-161106

(51) Int. Cl.[7] .............................................. H04N 7/20
(52) U.S. Cl. ...................... 725/68; 725/118; 725/131; 725/139; 725/151; 725/140; 725/152; 375/240.25; 375/240.26; 375/240.29; 375/260; 348/425.1; 348/726
(58) Field of Search .............................. 725/51, 48, 63, 725/59, 68, 56, 90, 91, 97, 152, 114, 118, 119, 131, 138, 139, 49, 151, 40, 140; 375/260, 240.25, 240.26, 240.29; 348/425.1, 726

(56) References Cited

U.S. PATENT DOCUMENTS

| 5,600,378 | A | * | 2/1997 | Wasilewski ................ 348/468 |
| 5,838,873 | A | * | 11/1998 | Blatter et al. ............ 375/240.25 |
| 5,844,478 | A | * | 12/1998 | Blatter et al. ............... 348/474 |
| 5,844,595 | A | * | 12/1998 | Blatter et al. ................. 455/83 |
| 5,864,358 | A | * | 1/1999 | Suzuki et al. ............... 725/142 |
| 5,894,320 | A | * | 4/1999 | Vancelette .................. 725/138 |
| 5,917,830 | A | * | 6/1999 | Chen et al. .................. 348/473 |
| 5,920,572 | A | * | 7/1999 | Washington et al. ........ 370/535 |
| 5,933,500 | A | * | 8/1999 | Blatter et al. ............... 380/200 |
| 6,005,562 | A | * | 12/1999 | Shiga et al. ................. 345/721 |
| 6,011,899 | A | * | 1/2000 | Ohishi et al. ................. 360/32 |

(List continued on next page.)

OTHER PUBLICATIONS

Rod Hewitt, 1997, North American MPEG–2 Information, pp. 15 and 32.*
The Authoritative dictionary of IEEE Standards Terms, Standards Information Network and IEEE Press, Seventh Edition, p. 703.*
Merriam–Websters's Collegiate Dictionary, 1993, Merriam–Webster, Incorporated, Tenth Edition, p. 285.*

*Primary Examiner*—Vivek Srivastava
*Assistant Examiner*—Jason P Salce
(74) *Attorney, Agent, or Firm*—Frommer Lawrence & Haug LLP; William S. Frommer; Dennis M. Smid

(57) ABSTRACT

The MPEG2TS packet S3 as the digital broadcast data is obtained from the ECC decoder. The NIT detecting circuit detects NIT from this packet S3, changes the transmitting frequency information and deletes the information (service information) of the program to be limited for viewing, thereby to obtain the table NITb. The NIT replacing circuit detects NIT from the packet S3 and replaces it to the table NITb, thereby to obtain the MPEG2TS packet S4 as the digital broadcast data in CATV. The digital broadcast signal $BS_1$ for CATV can be obtained by executing the error correction code adding process, modulating process and frequency-converting process to the packet S4. The receiving apparatus for receiving the predetermined program on the basis of the program information of NIT can no longer receive the program in relation to the program information deleted by NIT.

2 Claims, 15 Drawing Sheets

U.S. PATENT DOCUMENTS

| | | | | |
|---|---|---|---|---|
| 6,038,433 A | * | 3/2000 | Vegt | 455/161.1 |
| 6,040,850 A | * | 3/2000 | Un et al. | 725/133 |
| 6,115,074 A | * | 9/2000 | Ozkan et al. | 348/465 |
| 6,151,078 A | * | 11/2000 | Yoneda et al. | 348/558 |
| 6,172,988 B1 | * | 1/2001 | Tiernan et al. | 370/465 |
| 6,219,100 B1 | * | 4/2001 | Le Maguet et al. | 348/384.1 |
| 6,256,071 B1 | * | 7/2001 | Hiroi | 348/553 |
| 6,314,111 B1 | * | 11/2001 | Nandikonda et al. | 370/473 |
| 6,510,555 B1 | * | 1/2003 | Tsurumoto | 725/92 |
| 6,557,171 B1 | * | 4/2003 | Sonoda et al. | 725/136 |
| 6,588,014 B1 | * | 7/2003 | Hayashi | 725/54 |
| 6,604,243 B1 | * | 8/2003 | Freimann | 725/131 |
| 6,609,251 B1 | * | 8/2003 | Yoneda | 725/71 |
| 6,622,004 B1 | * | 9/2003 | Sonoda et al. | 455/3.05 |

* cited by examiner

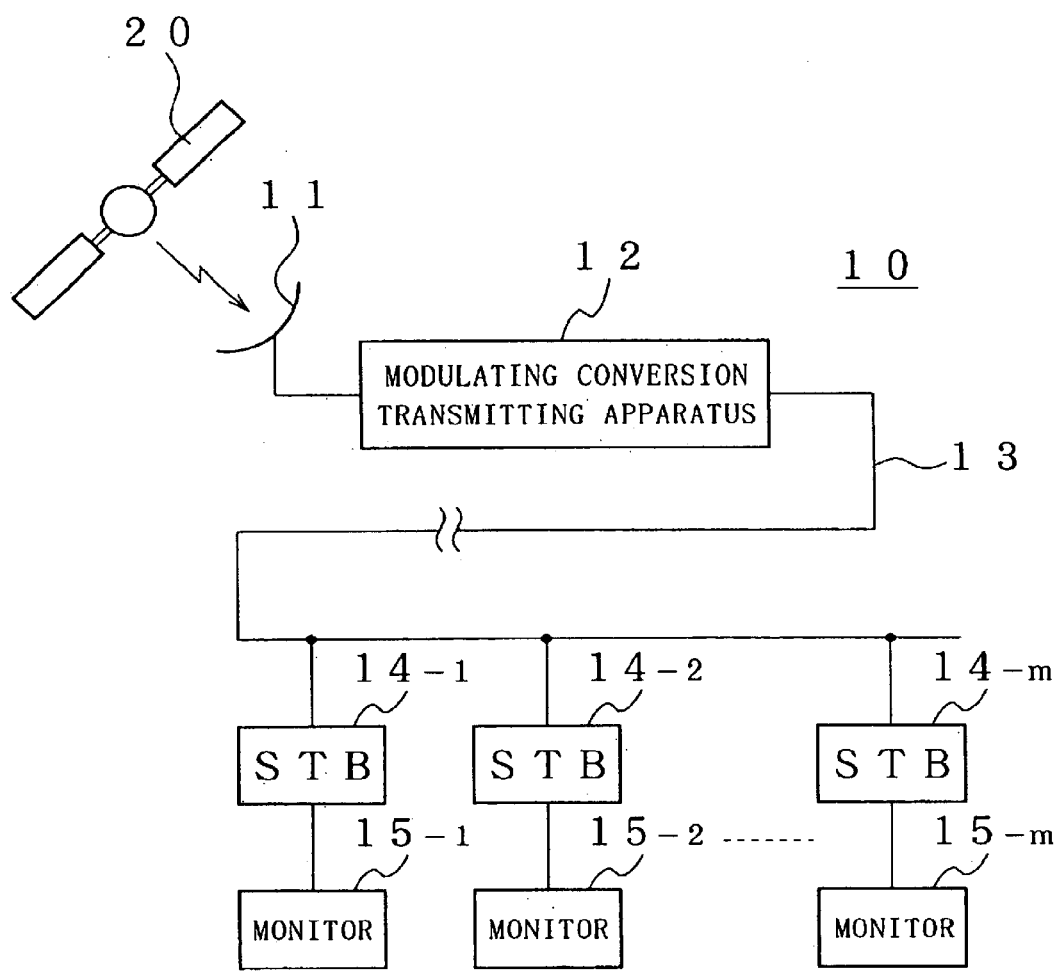

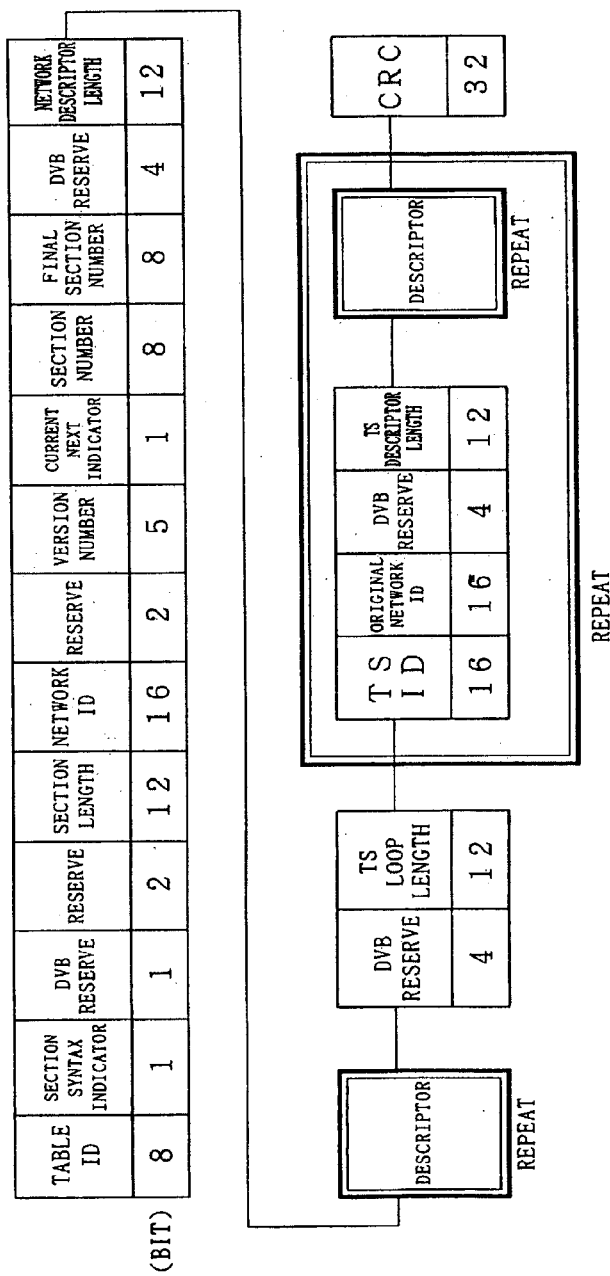
F I G. 7

SIGNAL PROCESSING APPARATUS AND SIGNAL RECEIVING APPARATUS

BACKGROUND OF THE INVENTION

1. Field of the Invention

The present invention relates generally to a signal processing apparatus and a signal receiving apparatus, which are suitable for realizing distribution services with the other networks of a digital broadcast program which is being broadcast by a selected network. More specifically, the present invention relates to a signal processing apparatus that can limit the viewing of a program easily and freely by detecting the NIT (Network Information Table) of a digital broadcast data in a first network, deleting information of the program to be limited for viewing among the various pieces of information included in the NIT and then attaining the digital broadcast data in a second network by replacing the NIT of the digital broadcast data in the first network with the NIT from which the information of the program explained above is deleted. Moreover, the present invention also relates to a receiving apparatus for preventing confusion of viewers by displaying no program guide information in relation to the program information not existing in the NIT among those detected from the digital broadcast data.

2. Description of the Related Art

Here, it is thought that a digital broadcast program being broadcast by a selected desired network is distributed by the other networks, for instance, a satellite digital multi-channel broadcast is distributed with a modulating conversion transmitting apparatus or the like by making use of the network provided within the facility of cable television company.

In this case, since a digital broadcast data has NIT including physical information in relation to transmission route, a digital broadcast program being broadcast by the first network cannot be distributed with the second network only by converting a modulating method with the modulating conversion transmitting apparatus or the like. Thus, transmission frequency information or the like included in the NIT of the digital broadcast data is applied to the second network.

Incidentally, NIT includes a program information, and a set top box (customer premises equipment) connected to the transmission route of the cable television, for example, detects NIT and receives the predetermined program on the basis of the program information included in the NIT.

For example, on the occasion of distributing a satellite digital multi-channel broadcast with the modulating conversion transmitting apparatus or the like using the network in the facilities of the cable television company, there may be cases where it is better to give limitation for viewing even when a program exists on the transmission route of the cable television.

Moreover, in these years, it has been proposed, in the satellite broadcast receiver, to detect a program guide information from the digital broadcast data and display such program guide information on a display unit for the convenience of viewers such as selection of program, etc. However, the program information included in NIT does not correspond to the program guide information on one to one basis. In this case, when the program guide information, in which the program does not correspond to the program information included in NIT and thus cannot be received, is displayed, such program is not received even when such program is selected based on the program guide information. This probably causes confusion for viewers.

SUMMARY OF THE INVENTION

It is therefore an object of the present invention to provide a signal processing apparatus for limiting viewing of a program easily and freely.

Moreover, it is also an object of the present invention to provide a receiving apparatus for preventing confusion of the viewers.

The signal processing apparatus according to the present invention is a signal processing apparatus for converting a first digital broadcast signal of the predetermined transmitting frequency on the first network to a second digital broadcast signal of the predetermined transmitting frequency on the second network. The signal processing apparatus preferably comprises a first frequency converting means for obtaining a first digital modulation signal by frequency-converting the first digital broadcast signal, a demodulating means for obtaining a digital broadcast data by demodulating the first digital modulation signal, a table detecting means for detecting NIT including the transmitting frequency information and program information from the digital broadcast data transmitted from such demodulating means, a first table changing means for changing at least transmission frequency information of NIT detected by the table detecting means to the information to be applied to the second network, a second table changing means for deleting information relating to the program to be limited for viewing among the program information of NIT detected by the table detecting means, a table replacing means for replacing NIT of the digital broadcast data transmitted from the demodulating means to NIT changed by the first and second table changing means, a modulating means for obtaining the second digital modulated signal by modulating the digital broadcast data in which NIT is replaced in the table replacing means, and a second frequency converting means for obtaining the second digital broadcast signal by frequency-converting the second digital modulated signal.

In the present invention, the first digital broadcast signal on the first network has the predetermined transmitting frequency, but this first digital broadcast signal is frequency-converted to the digital modulated signal and moreover it is then demodulated. Thereby, the digital broadcast data in the first network can be obtained. The digital broadcast data in the first network has NIT including the transmitting frequency information and program information. NIT is detected from the digital broadcast data in this first network and at least the transmitting frequency information is changed to be applied to the second network. Further, information of the program to be limited for viewing among the program information of NIT is deleted.

Here, NIT of the digital broadcast data in the first network is changed so that the transmitting frequency information or the like is changed to be applied to the second network. NIT of the digital broadcast data in the first network is then changed to the NIT from which information of the program to be limited for viewing is deleted. This provides the digital broadcast data in the second network. The digital broadcast data in this second network is modulated to a digital modulated signal and is then frequency-converted to obtain the second digital broadcast signal transmitted by the second network.

The receiving apparatus for receiving the predetermined program based on the program information of NIT does not receive the program other than the one existed in the program information of NIT. Therefore, as explained above, when a program exists on the transmission route, viewing of this program can be limited by deleting the information of the program to be limited for viewing among the program information of NIT.

Moreover, the receiving apparatus according to the present invention is based on a receiving apparatus for detecting NIT including program information from the digital broadcast data and receiving the predetermined program on the basis of the program information of NIT. This receiving apparatus preferably comprises a table detecting means for detecting NIT from the digital broadcast data, an information detecting means for detecting the program guide information from the digital broadcast data and a displaying means for displaying the program guide information detected by this information detecting means. In this receiving apparatus, the displaying means does not display the program guide information in relation to the program information not existing in the NIT detected by the table detecting means.

In the present invention, said display means does not display the program guide information in relation to the program information not existing in said network information table detected by said table detecting means. That is, said display means does not display the program guide information in relation to the program information other than the one existing in said network information table detected by said table detecting means. Therefore, program guide information displayed by the displaying means is only the guide information of program that can be received. Therefore, viewers can receive all programs selected on the basis of the program guide information. Accordingly, it does not occur that viewers cannot receive the program selected based on the program guide information. This prevents confusion of viewers.

A further understanding of the nature and advantages of the invention may be realized by reference to the following portions of the specification and drawings.

BRIEF DESCRIPTION OF THE DRAWINGS

FIG. 1 is a block diagram illustrating a structure of a digital CATV system as a preferred embodiment of the present invention;

FIG. 7 is a diagram illustrating a table format of a network information table (NIT);

DESCRIPTION OF THE PREFERRED EMBODIMENTS

Figure 2A:
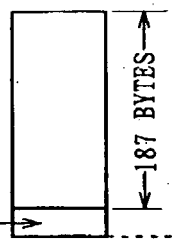
FIGS. 2A and 2B are diagrams illustrating a frame format of the MPEG2 transport packet and DVB system.

The preferred embodiment of the present invention will be explained in detail by referring to the accompanying drawings. FIG. 1 illustrates a digital CATV (Cable Television) system 10 utilizing a satellite digital multichannel broadcast as the preferred embodiment. This system 10 comprises an antenna 11 for receiving a digital broadcast signal from a plurality of transponders (satellite repeaters) of a communication satellite 20 and a modulating conversion transmitting apparatus 12 for generating a digital broadcast signal for CATV by changing transmitting frequency and modulating system, etc. of the received digital broadcast signal and then transmitting this signal to the transmission route 13. The transmitting route 13 is connected with set top box (customer premises equipment) $14_{-1}$ to $14_{-m}$ as the receiving terminal and the images of the channel numbers selected by these set top boxes $14_{-1}$ to $14_{-m}$ are displayed on the monitors $15_{-1}$ to $15_{-m}$.

Figure 2B:
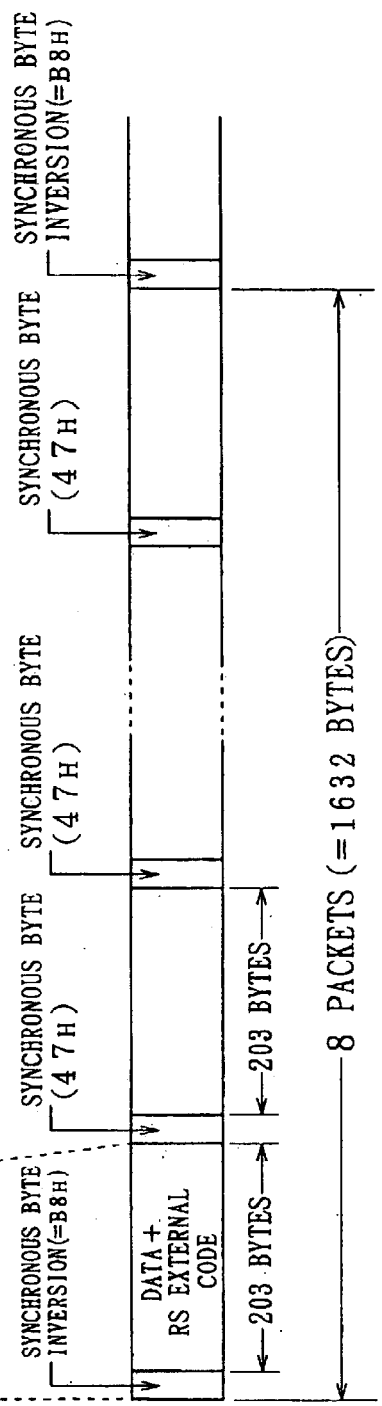

Here, the digital broadcast signal transmitted from the communication satellite 20 will be explained. In this embodiment, this digital broadcast signal corresponds to the DVB (Digital Video Broadcasting) system. FIG. 2B illustrates a frame format of the digital broadcast data in the DVB system and one frame is formed of eight MPEG2 transport packets (refer to FIG. 2A) In this case, frame synchronization is established by inverting once the synchronous byte in every eight ($8=B8_H$) packets using the synchronous byte ($=47_H$) in the packet. To each MPEG2 transport packet (MPEG2TS packet), an error correcting code of the Reed Solomon Code (204, 188) is added. The digital broadcast data illustrated in FIG. 2B is modulated by the QPSK(Quadrature Phase Shift Keying) modulation method and thereafter it is converted to the SHF band by the frequency conversion to become the digital broadcast signal transmitted from the communication satellite 20.

Figure 3:
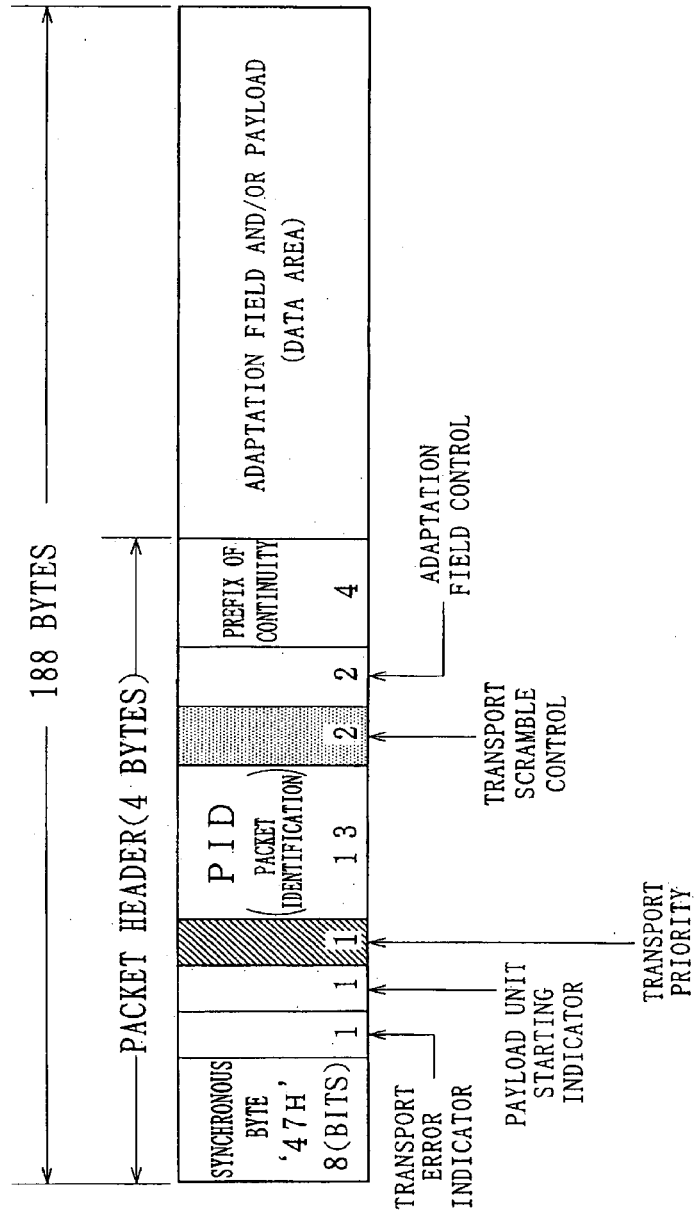
FIG. 3 is a diagram illustrating a packet format of the MPEG2 transport packet.
Figure 4:
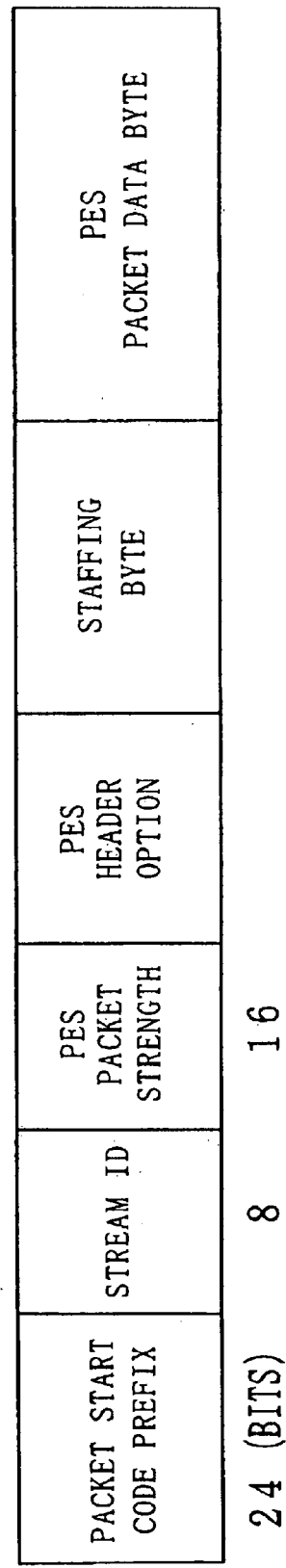
FIG. 4 is a diagram illustrating a packet format of the PES packet.

FIG. 3 illustrates a packet format of the MPEG2 transport packet. The leading 4 bytes of 188 bytes form a header. In the packet header, PID (Packet Identification: Packet identifier) indicating attribute of an individual stream (data stream) of the relevant packet is arranged. In the payload (data area) of the MPEG2 transport packet, the PES (Packetized Elementary Stream) packet indicating a packet format is re-divided for arrangement shown in FIG. 4 as is well known and moreover tables such as PAT (ProgramAssociation Table), PMT (ProgramMap Table), NIT (Network Information Table), etc. as the PSI (Program Specific Information: Program specification information) specified in the MPEG2 system, are also arranged in the section format.

Figure 5:
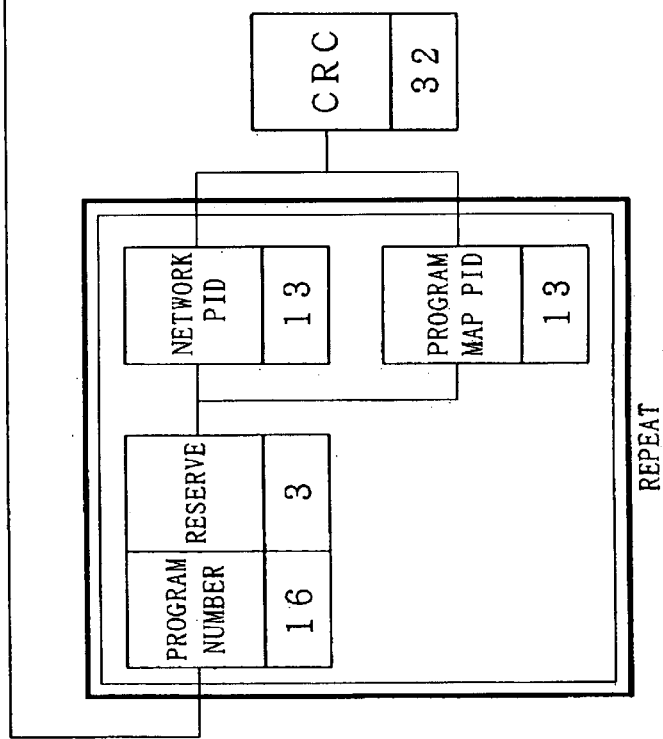
FIG. 5 is a diagram illustrating a table format of a program association table (PAT)

Here, PSI is the information required to realize simplified station selecting manipulation and program selection. PAT indicates, for every program number (16 bits), PID of PMT for transmitting information of the packet forming such program. FIG. 5 illustrates a table format of PAT. As PID of PAT itself, PID="0" is assigned in the fixed manner.

Principal contents will then be explained. Table ID indicates a class of table and is given by "0x00" (hexadecimal notation) in PAT. TS (Transport Stream) ID identifies a stream (multiplexed encoded data) and corresponds to the transponder in the case of a satellite. A version number added each time when content of table is updated. A current next indicator is used to identify the version when the old and new versions are transmitted simultaneously. A program number identifies individual channels. Network ID indicates PID of NIT when the program number is "0x0000". Program map PID indicates PID of PMT.

Figure 6:
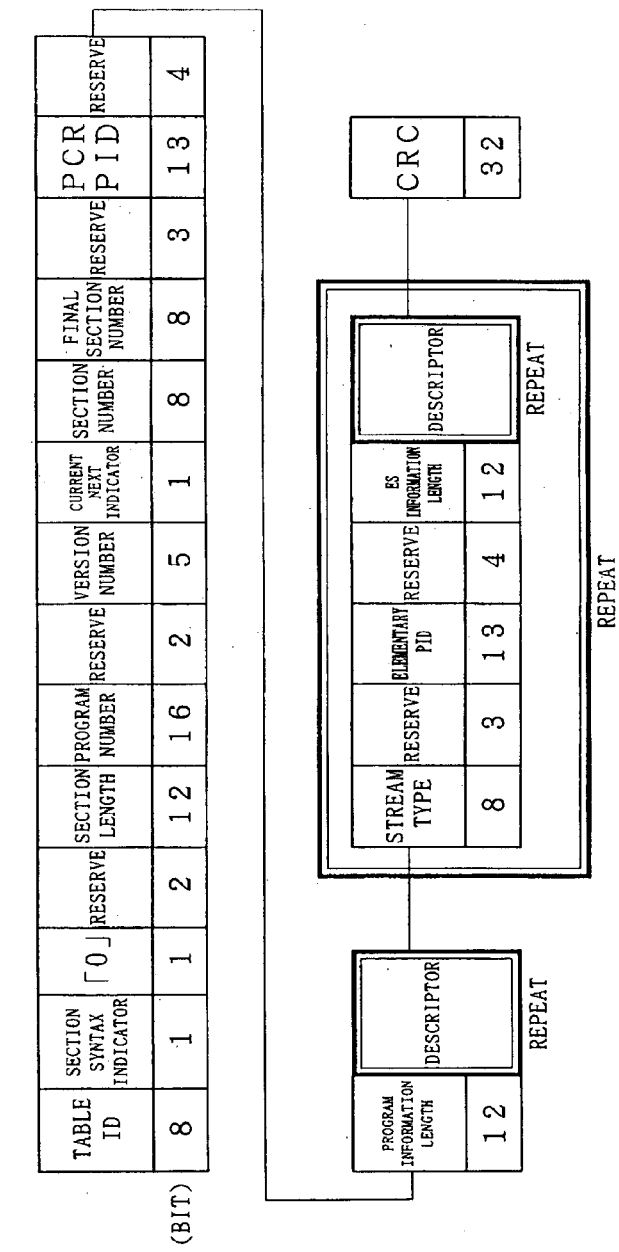
FIG. 6 is a diagram illustrating a table format of a program map table (PMT)

Moreover, PMT indicates PID of the packet for transmitting, for each program number, the stream of image, voice and additional data, etc. forming the program thereof. PID of PMT itself is designated by PAT as explained above. FIG. 6 illustrates a table format of PMT. Principal content not overlapping with PAT will be explained. Table ID indicates a class of table and is "0x02" in PMT. PCR PID indicates PID of the packet including the clock (PCR) as the reference for the decoding. Stream type indicates a class of signal transmitted as the stream such as image, voice and additional data or the like.

Moreover, NIT indicates a physical information in relation to the transmitting route, namely the orbit, in the case of satellite, polarization and frequency of each transponder, etc. PID of NIT itself is designated by PAT as explained above. FIG. 7 illustrates a table format of NIT. Principal content not overlapping with PAT and PMT will be explained. Table ID indicates a class of table and is "0x40" in the relevant network and "0x41" in the other networks. Network ID identifies the network. In the case of satellite, the network ID corresponds to individual satellite.

In addition, a couple of descriptors for playing an important role as a part of NIT will then be explained. First, a satellite delivery system descriptor will be explained. This descriptor is used as the first one of the descriptors repeated depending on the length of TS (transport stream) descriptor and is forming a pair with TS (transport stream) ID.

Figure 8:
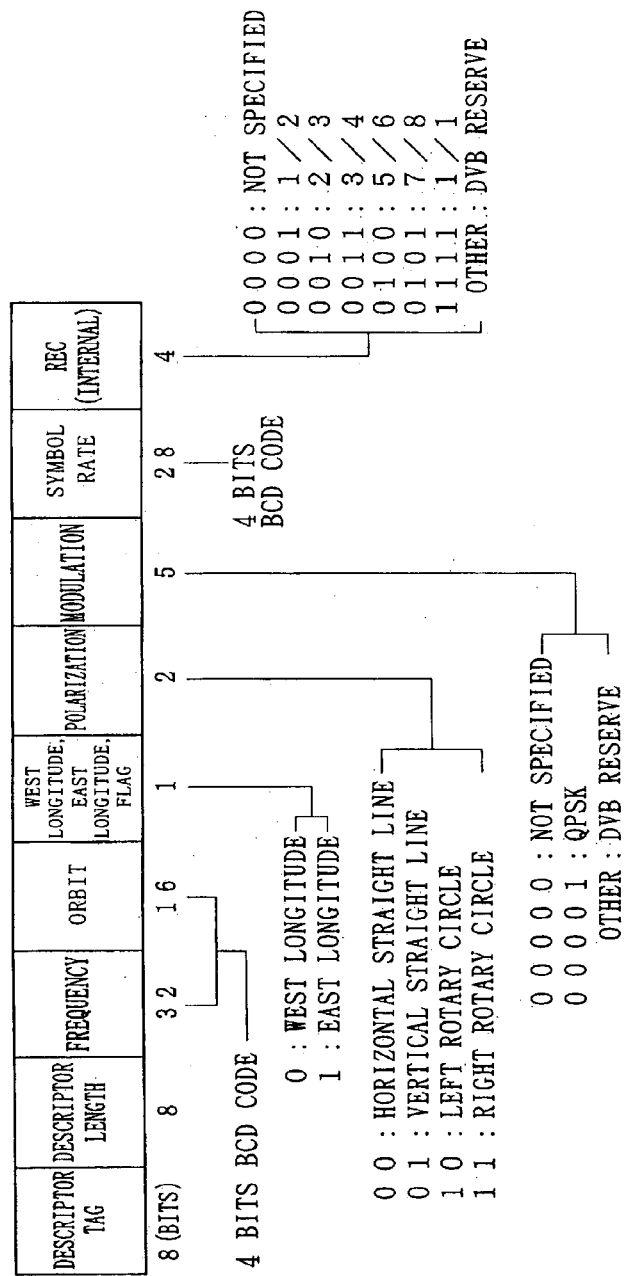
FIG. 8 is a diagram illustrating a structure of satellite delivery system descriptor in NIT.

FIG. 8 illustrates a format of satellite delivery system descriptor. The descriptor tag is specified by DVB to indicate a class of descriptor. In this descriptor, descriptor tag becomes "0x43". Frequency indicates the transmission frequency of each stream (here, transponder). Orbit/west longitudes·east longitude flag/polarization indicate orbit of satellite and polarization. Modulation/symbol rate/internal error correction encoding rate indicates the specification for transmitting system.

Next, the service list descriptor will be explained. This descriptor is used as the second and subsequent descriptors of the descriptors repeated depending on the length of TS (transport stream) descriptor to indicate the ID of service (channel) multiplexed on the relevant stream (here, transponder). That is, a plurality of service list descriptors are associated with only one TS (transport stream) ID.

Figure 9:
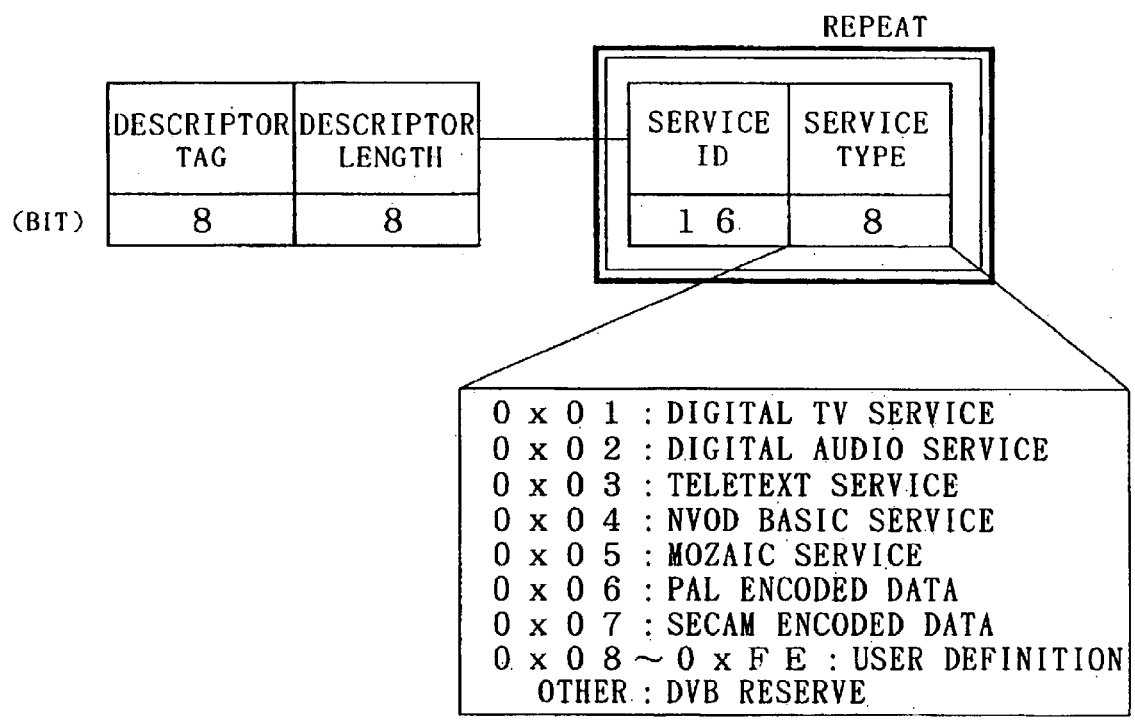
FIG. 9 is a diagram illustrating a structure of service list descriptor in NIT.

FIG. 9 illustrates a structure of service list descriptor. The descriptor tag is specified with DVB to indicate a class of descriptor. In this descriptor, "0x41" is given. The service ID identifies the service. Usually, service is matched with the channel selected by a viewer. Service type indicates content of service such as image, voice and data or the like.

Moreover, information of EPG (Electronic Program Guide) is also arranged in the payload area (data area) of the MPEG2 transport packet. EPG is one of the services peculiar to digital multi-channel broadcast. A viewer can easily search the desired program by displaying program information on the monitor screen as the program guide information by receiving the program information. EPG is used to select and display the broadcasting program and to reserve the programs after several days in future. EPG information is described in the section format table called SI (Service Information). A receiver extract the necessary information from this table to display it on the display screen. There are provided SDT (Service Description Table) indicating channel information and EIT (Event Information Table) indicating event (program) information as the typical tables.

Figure 10:
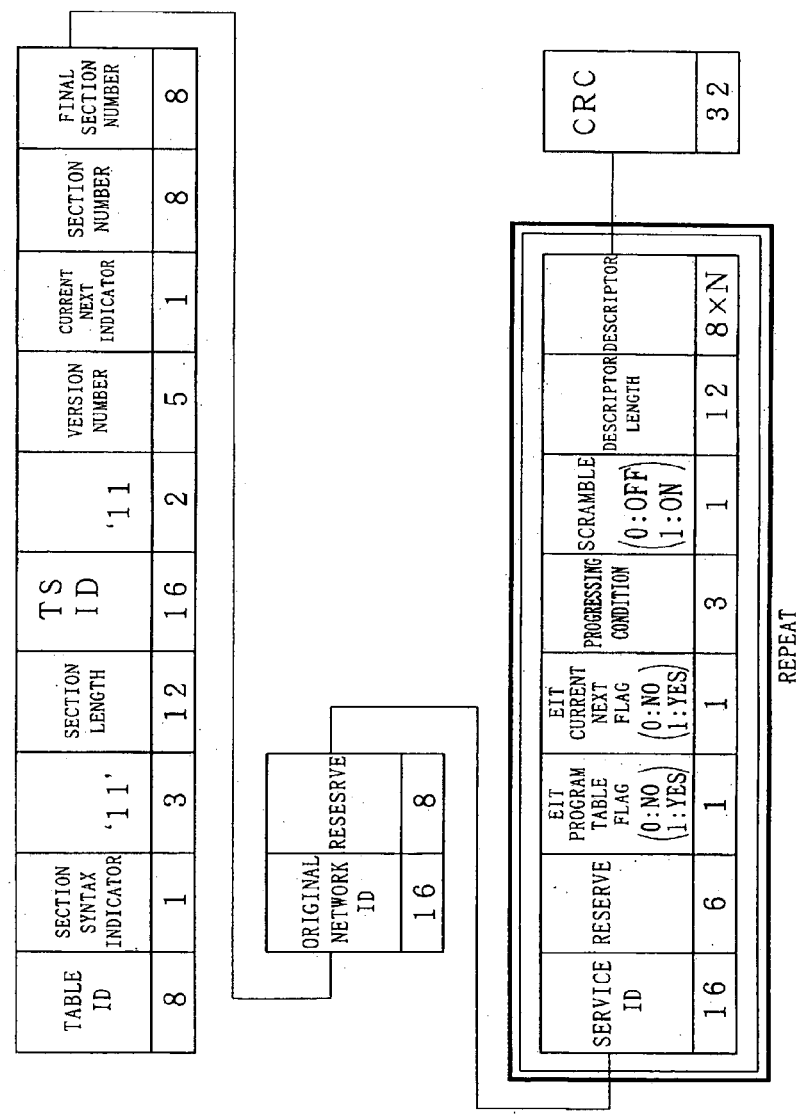
FIG. 10 is a diagram illustrating a table format of service description table (SDT)

In the SDT, channel number, channel name and channel content etc. are described. "0x0011" is fixed as PID. FIG. 10 illustrates a table format of SDT. Principal content will be explained. Table ID indicates a class of table and "0x42" is given for the relevant network, while "0x46" to the other networks. In SDT, existence of scramble regarding each service multiplexed in the transport stream having TSID in which the relevant table exists, is described and moreover in the descriptor included in SDT, service name, service content and service type, etc. of the relevant service are described.

Figure 11:
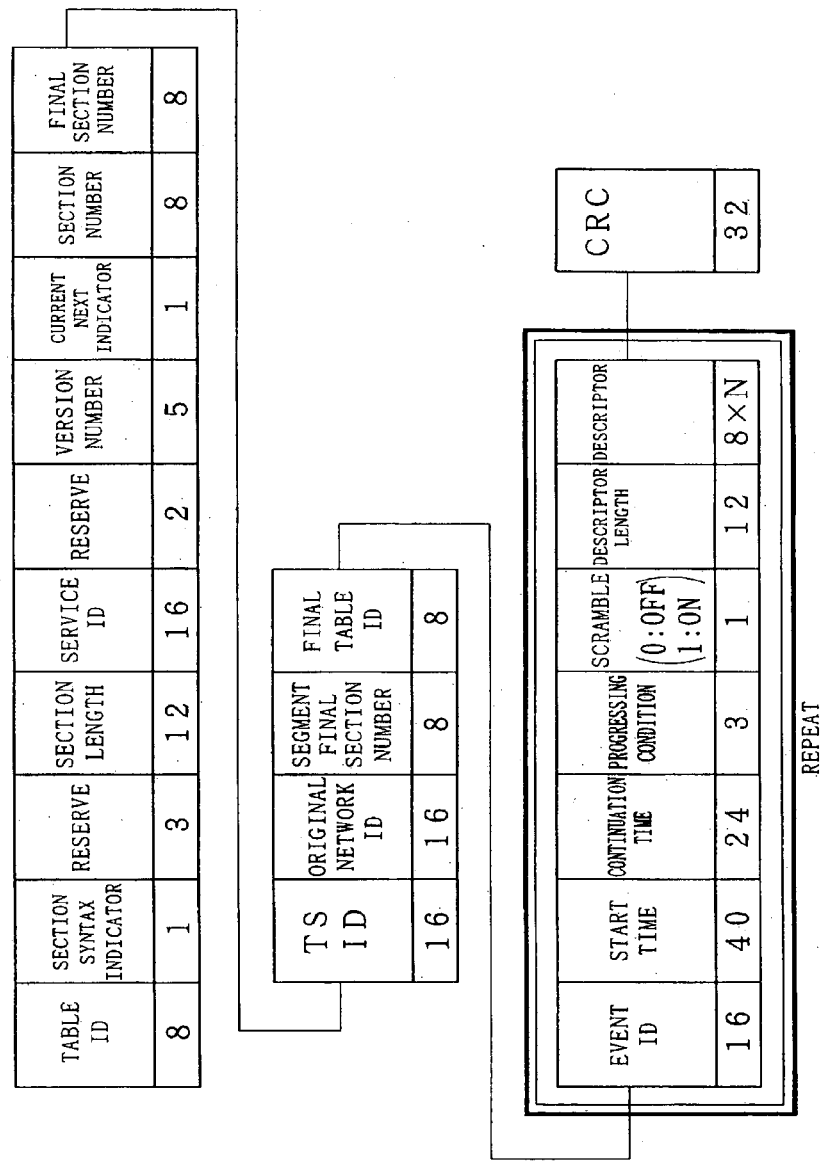
FIG. 11 is a diagram illustrating a table format of event information table (EIT)

In EIT, a program name, program starting time, story and genre, etc. are described. The fixed PID is "0x0012". FIG. 11 illustrates a table format of EIT. Principal content will be explained. Table ID is "0x4E" for the relevant network, while "0x4F" for the other networks. In EIT, in regard to a plurality of events (=programs) forming one service (=program=channel), the event starting time, continuation time, progressing condition, existence of scramble are described and in addition, a program name, program genre, pay per view program fee and information regarding story, etc. are described in the descriptor included in EIT.

Figure 12:
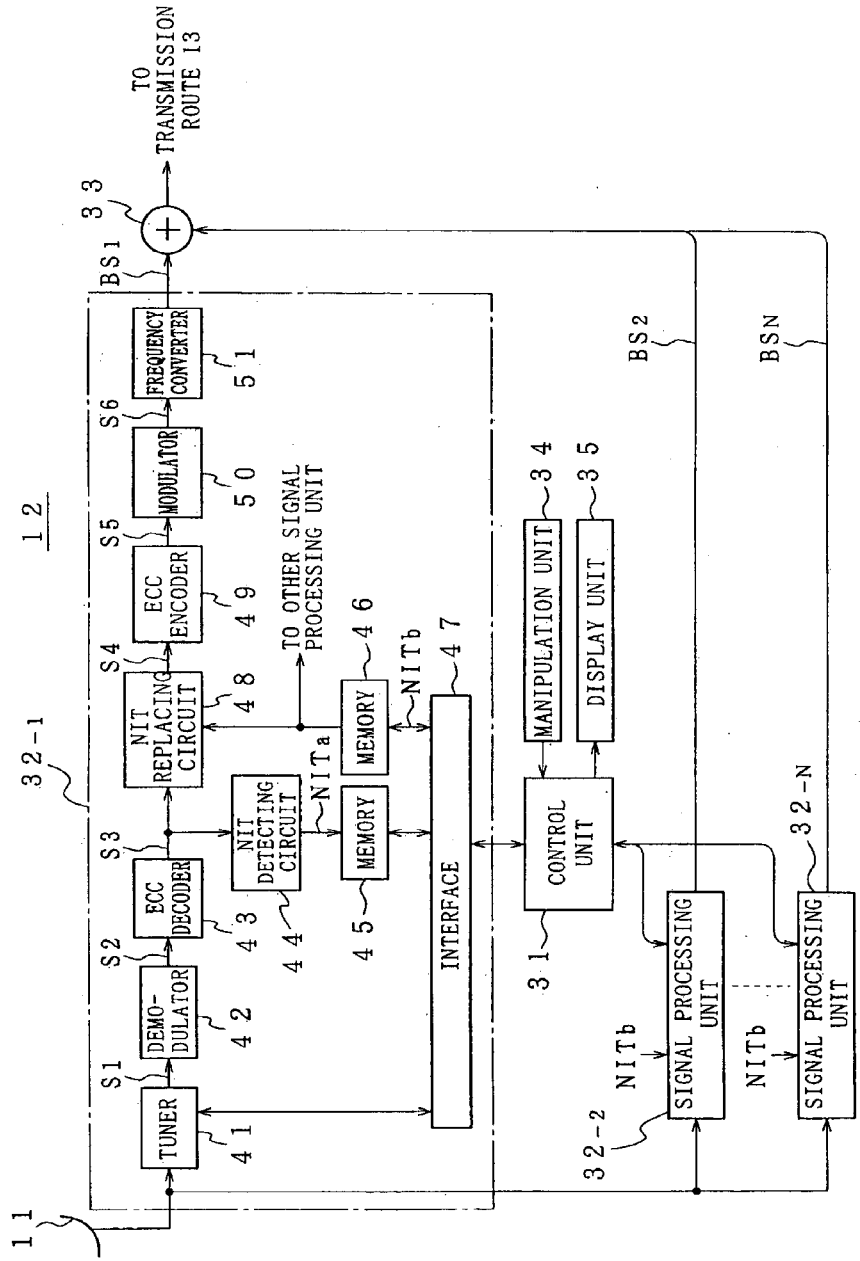
FIG. 12 is a block diagram illustrating a structure of a modulating conversion transmitting apparatus forming a digital CATV system.

FIG. 12 illustrates a structure of a modulating conversion transmitting apparatus 12 in the digital CATV system 10 of FIG. 1. This transmitting apparatus 12 changes the transmitting frequency and modulation system, etc. of the digital broadcast signal transmitted from the first to Nth transponders (satellite repeaters) of the communication satellite 20 to generate the digital broadcast signal for CATV and then transmits this signal to the transmission route 13. In each digital broadcast signal, a plurality of programs are multiplexed.

The transmitting apparatus 12 is provided with a microcomputer. The transmitting apparatus 12 comprises a control unit 31 for controlling operations of the apparatus as a whole, 1st to Nth signal processing unit $32_{-1}$ to $32_{-N}$ for generating the digital broadcast signals $BS_1$ to $BS_N$ for CATV in the VHF (Very High Frequency) band or UHF (Ultra High Frequency) band by processing the digital broadcast signal of the SHF (Super High Frequency) band transmitted from the 1st to Nth transponders of the communication satellite 20, and an adder 33 for adding these digital broadcast signals $BS_{-1}$ to $BS_{-N}$ and then transmitting the signals to the transmission route 13. The control unit 31 is connected with a manipulation unit 34 for setting the receiving frequency of the tuners of each signal processing unit $32_{-1}$ to $32_{-N}$ and a display unit 35 which is structured by a liquid crystal display unit to display the condition of the transmitting apparatus 12.

The signal processing unit $32_{-1}$ comprises a tuner 41 for selecting, from a plurality of digital broadcast signals of the SHF band received by the antenna 11, the digital broadcast signal transmitted from the first transponder of the communication satellite 20 and executing the frequency conversion process to such digital broadcast signal to obtain the QPSK modulated signal S1, a demodulator 42 for obtaining a signal S2 of the frame format of DVB by demodulating this QPSK modulated signal S1 and an ECC (Error Correcting Code) decoder 43 for sequentially obtaining the MPEG2 transport packet S3 as the digital broadcast data by conducting error correction to the signal S2 of the frame format of DVB output from the demodulator 42.

Moreover, the signal processing unit $32_{-1}$ also comprises an NIT detecting circuit 44 for detecting NIT (network information table) from the MPEG2 transport packet S3 sequentially output from the ECC decoder 43, a memory 45 for storing the table NITa detected by the NIT detecting circuit 44 and a memory 46 for storing the table NITb obtained by changing the table NITa stored in the memory 45 in the control unit 31. In the NIT detecting circuit 44, NIT is detected on the basis of the fixed PID. As explained above, the table format of NIT in the digital broadcast data in relation to the communication satellite 20 is shown in FIG. 7. Accordingly, the table format of table NITa detected by the NIT detecting circuit 44 is similar to that explained above.

Figure 13:
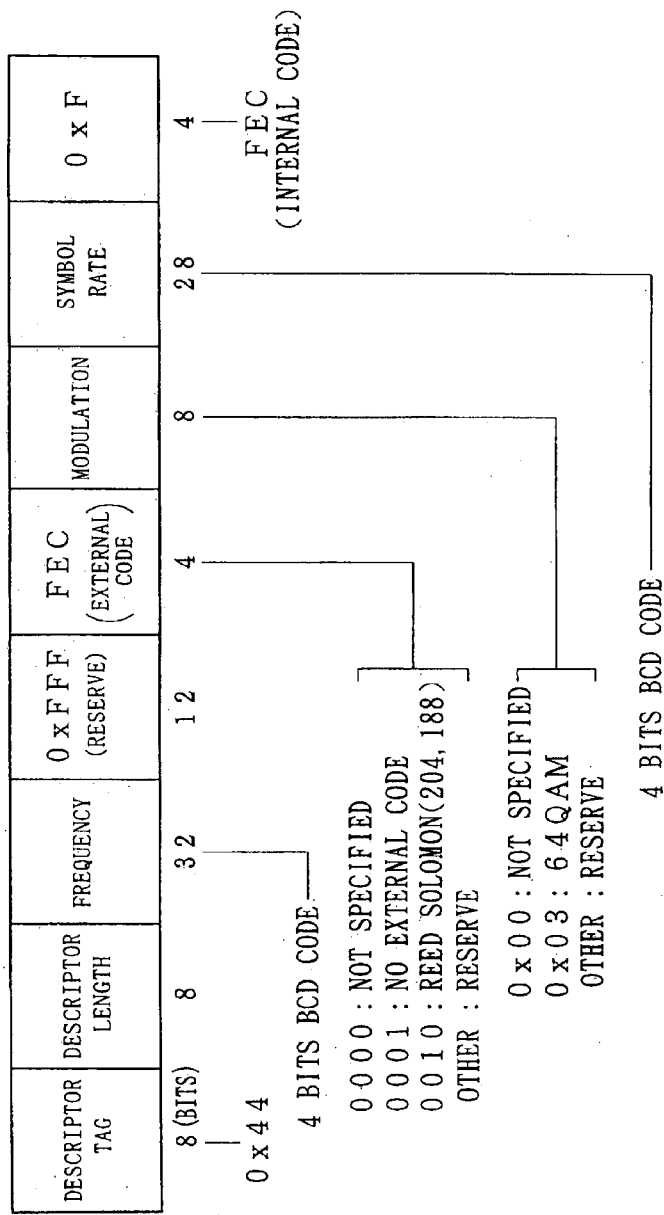
FIG. 13 is a diagram illustrating a structure of CATV delivery system descriptor.

The control unit 31 changes, for obtaining the table NITb, the satellite delivery system descriptor (refer to FIG. 8) having the transmitting frequency information, etc. in the table NITa to the CATV delivery system descriptor indicating its format in FIG. 13. Since the total length of this CATV delivery system descriptor is similar to that of the satellite delivery system descriptor, it is enough to simply replace these descriptors.

Principal content will be explained. The descriptor tag is specified by DVB to indicate a class of descriptor. In this descriptor, "0x44" is given. Frequency indicates the transmission frequency of each stream (multiplexed encoded data) in CATV. FEC (external code) indicates the error correction code as the external code. In this descriptor, "0010" is given. The modulation/symbol rate/FEC (internal code) indicates the specification regarding the transmission system.

Moreover, the control unit 31 deletes, to obtain the table NITb, the information of service (program) to be limited for viewing corresponding to manipulation of the manipulation unit 34. In this case, the display unit 35 may display content (service multiplexed to the transport stream of each TSID) of the table NITa detected by the NIT detecting circuit 44. Under this condition, when the manipulation unit 34 designates the service to be limited for viewing, such service information is deleted from the table NITa.

For example, when the services multiplexed to a certain TSID are all designated as the services to be limited for viewing, the information in relation to such TSID (information from TSID to descriptor in FIG. 7) is completely deleted. Moreover, for example, when a part of the services multiplexed to a certain TSID is designated as the services to be limited for viewing, the information of such services (service ID, service type in FIG. 9) is deleted from the service list descriptor in relation to such TSID.

In some cases, the number of digital broadcast signals in CATV is less than the number of digital broadcast signals in the satellite digital broadcast. That is, when the communication satellite 20 has L transponders and the number of digital broadcast signals in the satellite digital broadcast is L, N (N<L) digital broadcast signals among L digital broadcast signals are selectively used in CATV. In this case, the control unit 31 deletes, on the occasion of obtaining the table NITb, the information (information from transport stream ID to descriptor in FIG. 7) in relation to the TSID corresponding to the digital broadcast signal not used in CATV in the table NITa.

Read and write operations of the memories 45, 46 are controlled by the control unit 31 via the interface 47. The receiving frequency of the tuner 41 explained above is also controlled by the control unit 31 via the interface 47.

Moreover, the signal processing unit $32_{-1}$ has an NIT replacing circuit 48 for detecting NIT from MPEG2 transport packet S3 sequentially output from the ECC decoder 43 and then replacing such NIT with the table NITb stored in the memory 46. This NIT replacing circuit 48 also detects NIT based on the fixed PID. Moreover, upon obtaining of the table NITb in the control unit 31, when information of the service (program) to be limited for viewing is deleted, a dummy bit is inserted to the part in relation to the deleted information, although not described above. Therefore, total length of NIT becomes equal to that before deletion and thereby replacement can be done easily. In the NIT replacing circuit 48, only replacement of NIT is conducted and the information of EPG included in the packet S3 and packet S4 is common to the EPG information.

Moreover, the signal processing unit $32_{-1}$ has an ECC encoder 49 for obtaining the signal S5 (refer to FIG. 2B) of the frame format of DVB by adding, for example, the error correction code of the Reed Solomon (204, 188) to the MPEG2 transport packet S4 in which NIT is replaced by the NIT replacing circuit 48, a modulator 50 for conducting the modulating process of 64QAM (Quadrature Amplitude Modulation) to the signal S5 of the frame format of this DVB and a frequency converter 51 for obtaining the digital broadcast signal $BS_1$ for CATV of the VHF or UHF band by converting the frequency of the 64QAM modulated signal output from this modulator 50.

Each of the signal processing units $32_{-2}$ to $32_{-N}$ has a structure comprising a tuner 41, a demodulator 42, an ECC decoder 43, an interface 47, an NIT replacing circuit 48, an ECC encoder 49, a modulator 50 and a frequency converter 51 of the signal processing unit $32_{-1}$ explained above. In each of the NIT replacing circuits 48 of the signal processing units $32_{-2}$ to $32_{-N}$, NIT replacement is carried out by using the table NITb stored in the memory 46 of the signal processing unit 321. Moreover, each of the tuners of the signal processing units $32_{-2}$ to $32_{-N}$ selects, from a plurality of digital broadcast signals received by the antenna 11, the digital broadcast signal transmitted from the 2nd to Nth transponders of the communication satellite 20 to obtain the QPSK modulated signal S1 through the frequency conversion process to such digital broadcast signal. The receiving frequency of each of the tuners of the signal processing units $32_{-2}$ to $32_{-N}$ is controlled by the control unit 31 via the interface 47. In addition, each of the frequency converters 51 of the signal processing units $32_{-2}$ to $32_{-N}$ executes the frequency conversion to provide different transmitting frequencies of the digital broadcast signals $BS_1$ to $BS_N$.

Next, operations of the modulating conversion transmitting apparatus 12 illustrated in FIG. 12 will be explained. A plurality of digital broadcast signals of the SHF band received by the antenna 11 is supplied to the tuner 41 of signal processing unit 321. The tuner 41 selects the digital broadcast signal transmitted from the first transponder of the communication satellite 20 and then executes the frequency conversion process to such digital broadcast signal to obtain the QPSK modulated signal S1. This QPSK modulated signal S1 is then supplied to the demodulator 42. This demodulator 42 executes demodulating process to the QPSK modulated signal S1 to obtain the signal S2 of the frame format of DVB (refer to FIG. 2B). The signal S2 of the frame format of the DVB is supplied to the ECC decoder 43. This decoder 43 executes error correction process to the signal S2 of the frame format of DVB to sequentially obtain the MPEG2 transport packet S3 as the digital broadcast data (refer to FIG. 2A)

Moreover, the MPEG2 transport packet S3 sequentially output from the ECC decoder 43 is then supplied to the NIT detecting circuit 44. This NIT detecting circuit 44 detects NIT from the MPEG2 transport packet S3. The detected table NITa is supplied to the memory 45 and is then stored therein. Although not explained above, the NIT detecting operation in the NIT detecting circuit 44 is performed once in every day, for example. Preferably, the control unit 31 reads the table NITa from the memory 45, changes the satellite delivery system descriptor (refer to FIG. 8) in the table NITa to the CATV delivery system descriptor (refer to FIG. 13), deletes the information of the service (program) designated to be limited for viewing in the table NITa and then deletes the information in relation to the TSID corresponding to the digital broadcast signal not used in CATV in the table NITa, thereby to obtain the table NITb and then to store the table NITb in the memory 46.

In addition, the MPEG2 transport packet S3 sequentially output from the ECC decoder 43 is supplied to the NIT replacing circuit 48. This NIT replacing circuit 48 detects NIT and replaces its NIT part to the table NITb stored in the memory 46. In this case, when the information of service (program) to be limited for viewing is deleted on the occasion of obtaining the table NITb with the control unit 31, a dummy bit is inserted to the part in relation to the deleted information.

Moreover, the MPEG2 transport packet S4 in which NIT is replaced by the NIT replacing circuit 48 is supplied to the ECC encoder 49. This ECC encoder 49 forms the signal S5 of frame format of DVB, for example, through addition of the error correction code of Reed Solomon (204, 188), for example. The signal S5 of frame format of this DVB is then supplied to the modulator 50. This modulator 50 executes modulation process of 64QAM to the signal S5 of the frame format of DVB to obtain the 64QAM modulated signal S6. The 64QAM modulated signal S6 is then supplied to the frequency converter 51. This frequency converter 51 executes frequency conversion process to the 64QAM modulated signal S6 to obtain the digital broadcast signal $BS_1$ for CATV of the predetermined transmitting frequency of the VHF or UHF band.

Moreover, a plurality of digital broadcast signals of SHF band received by the antenna 11 are supplied to the signal processing units $32_{-2}$ to $32_{-N}$ and respective tuners select the digital broadcast signal transmitted from the 2nd to Nth transponders of the communication satellite 20 and obtains the QPSK modulated signal S through the frequency conversion process to such digital broadcast signal. The signal processing units $32_{-2}$ to $32_{-N}$ perform the processes similar to that of the signal processing unit $32_{-1}$ such as the replacement of NIT in the NIT replacing circuit 48 using the table NITb stored in the memory 46 of the signal processing unit $32_{-1}$. Thereby, the digital broadcast signals $BS_2$ to $BS_N$ for CATV of the predetermined transmitting frequency of the VHF or UHF band can be obtained. These digital broadcast signals $BS_1$ to $BS_N$ are supplied to the adder 33 for addition and the added signal is then transmitted to the transmission route 13 of CATV system.

Figure 14:
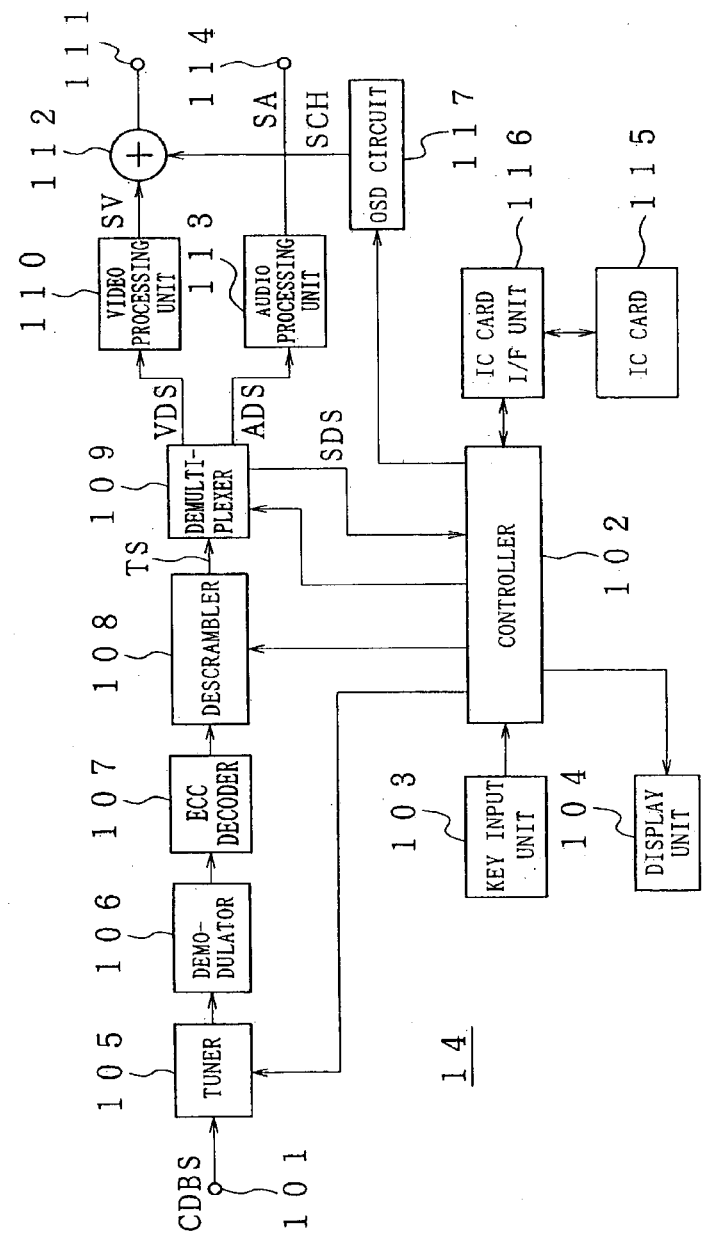
FIG. 14 is a block diagram illustrating a structure of set top box (STB) forming a digital CATV system.

FIG. 14 illustrates a structure of set top box 14 ($14_{-1}$ to $14_{-m}$) in the digital CATV system 10 of FIG. 1.

This set top box 14 comprises a terminal 101 connected to the transmission route 13 of CATV and a microcomputer, a controller 102 for controlling the total operation, said controller including a microcomputer, and a tuner 105 for selecting the broadcast signal of the predetermined RF channel from the digital broadcast signal CDBS supplied to the terminal 101 from the transmission route 13 of CATV and outputting the digital modulated data corresponding to the broadcast signal of the predetermined RF channel.

The controller 102 is connected with a key input unit 103 for accepting manipulation such as program selection by viewer and a display unit 104 consisting of a liquid crystal display element or the like for displaying the operating condition of the apparatus. Program selecting operation by the tuner 105 is controlled by the controller 102 on the basis of manipulation at the key input unit 103 by viewer.

Moreover, the set top box 14 comprises a demodulator 106 for conducting demodulating process to the digital modulated data output from the tuner 105, ECC decoder 107 for obtaining the MPEG2 transport stream TS corresponding to the broadcast signal of the predetermined RF channel explained above by executing the error correction process to the output data of the demodulator 106, and a descrambler 108 for canceling the scramble process applied to the packets of the video data and audio data of the transport stream TS.

In addition, the set top box 14 also has a demultiplexer 109 for isolating the packets of video data and audio data of the channel designated by the manipulation of the key input unit 103 by user from the transport stream TS output from the descrambler 108, outputting the video data stream VDS and audio data stream ADS consisting of these packets and simultaneously isolating the packet of the additional data of such channel to output the additional data stream SDS consisting of such packet.

The demultiplexer 109 also acquires, under the control of the controller 102, NIT, PAT, PMT as the program specific information (PSI) explained above and SDT, EIT in which EPG information explained above is described. These pieces of information acquired are then supplied to the controller 102.

The set top box 14 also comprises a video processing unit 110 for obtaining a video signal SV by executing the data expanding process or the like to the video data stream VDS, a video output terminal 111 for outputting such video signal SV, a combiner 112 inserted between the video processing means 110 and video output terminal 111 to combine the character display signal SCH such as program guide information explained later, an audio processing means 113 for obtaining an audio signal SA by executing data expanding process or the like to the audio data stream ADS, and an audio output terminal 114 for outputting such audio signal SA.

Moreover, the set top box 14 also has an IC card interface unit 116 to which an IC card 115 is connected. The IC card interface unit 116 is connected to the controller 102. The IC card 115 stores key information of scramble and also has a function to judge whether viewing is possible or not based on the limited receiving information transmitted from the controller 102 via the IC card interface unit 116 and to send, when viewing is possible, the key information of scramble to the controller 102 via the IC card interface unit 116.

The set top box 14 moreover has an OSD (On Screen Display) circuit 117 for generating the character display signal SCH for displaying characters on the display screen. This OSD circuit 117 is connected to the controller 102 and its character display signal generating operation is controlled by the controller 102.

Next, the receiving operation of the set top box 14 illustrated in FIG. 14 will be briefly explained with reference to the flowchart of FIG. 15.

The program number corresponds to the channel number selected by a viewer in PAT and PMT and the service ID corresponds to that in NIT, respectively. Moreover, NIT includes information of the network as a whole, namely all transponders. Therefore, the same table is transmitted in parallel in all transponders. PAT and PMT are respectively composed of only the information of program within the tarnsponders to be transmitted and are different in content for each transponder.

Here, it is assumed that a viewer manipulates the key input means 103 to select the channel "M" (step ST1). In this case, the controller 102 controls the demultiplexer 109 so that it acquires NIT with fixed PID therein and searches "M" for the service ID in the service list descriptor incorporated to each TSID of such NIT (step ST2).

When the service ID "M" is detected (step ST3), the controller 102 recognizes the frequency of transponder transmitting the channel "M" from the CATV delivery system descriptor combined before the service list descriptor including the service ID "M" and controls the received frequency of the tuner 105(step ST4). Thereby, the tuner 105 selects the digital broadcast signal from the predetermined signal processing unit of the modulating conversion transmitting apparatus 12 transmitting the channel "M".

The controller 102 then controls the demultiplexer 109 so that it acquires PAT by the fixed PID and recognizes the program number "M" in the PAT by searching "M" for the program number in the PAT to obtain the program map PID associated with the program number "M" (step ST5). The controller 102 then controls the demultiplexer 109 so that it acquires PMT by the program map PID and recognizes the elementary PID for each stream type (image, audio, etc.) corresponding to the program number "M" in the PMT (step ST6).

Next, the controller 102 controls the demultiplexer 109 to isolate the transport stream packet having the PID matched with the elementary PID (step ST7). In this case, the demultiplexer 109 also isolates the packet of the video data and audio data of the channel "M" and also isolates the packet of the additional data of channel "M".

Here, the controller 102 supplies the limited receiving information extracted from the additional data stream SDS to the IC card 113 via the IC card interface unit 116. In the IC card 113, enabling/disabling of viewing is judged on the basis of the limited receiving information. When viewing is possible, the key information of scramble is sent to the controller 102 via the IC card interface unit 116 from the IC card 115. This key information is set to the descrambler 108 by the controller 102. Therefore, scramble of the packet of video data and audio data being scrambled is canceled in the descrambler 108 and thereby the video data stream VDS and audio data stream ADS obtained by the demultiplexer 109 is related to the data descrambled.

The video data and audio data output from the demultiplexer 109 are decoded to output the video signal SV and audio signal SA of the channel "M" (step ST8). That is, the video signal SV is generated by conducting the process such as data expansion in the video processing unit 110 to the video data stream VDS output from the demultiplexer 109, and this video signal SV is guided to the output terminal 111 via the combiner 112. Moreover, the audio signal SA is generated by conducting the process such as data expansion in the audio processing unit 113 to the audio data stream ADS output from the demultiplexer 109, and this audio signal SA is guided to the output terminal 114. The video signal SV obtained at the output terminal 111 is supplied to a monitor (not illustrated) and thereby the image of the channel "M" can be displayed and the audio signal SA obtained at the output terminal 114 is supplied to a speaker (not illustrated) to output the voice of the channel "M".

Moreover, when the service ID "M" is not detected (step ST9) as a result of searching for "M" in regard to the service ID in the service list descriptor incorporated to the each TSID of NIT, the controller 102 causes the display unit 104 to display that reception is impossible (step ST9) and completes the receiving operation. Therefore, when the information in relation to TSID and service information of service list descriptor are deleted from NIT as the service (program) information to be limited for viewing in the modulating conversion transmitting apparatus 12 (refer to FIG. 12) as explained above, the reception of such service (program) becomes impossible in the set top box 14.

Figure 15:
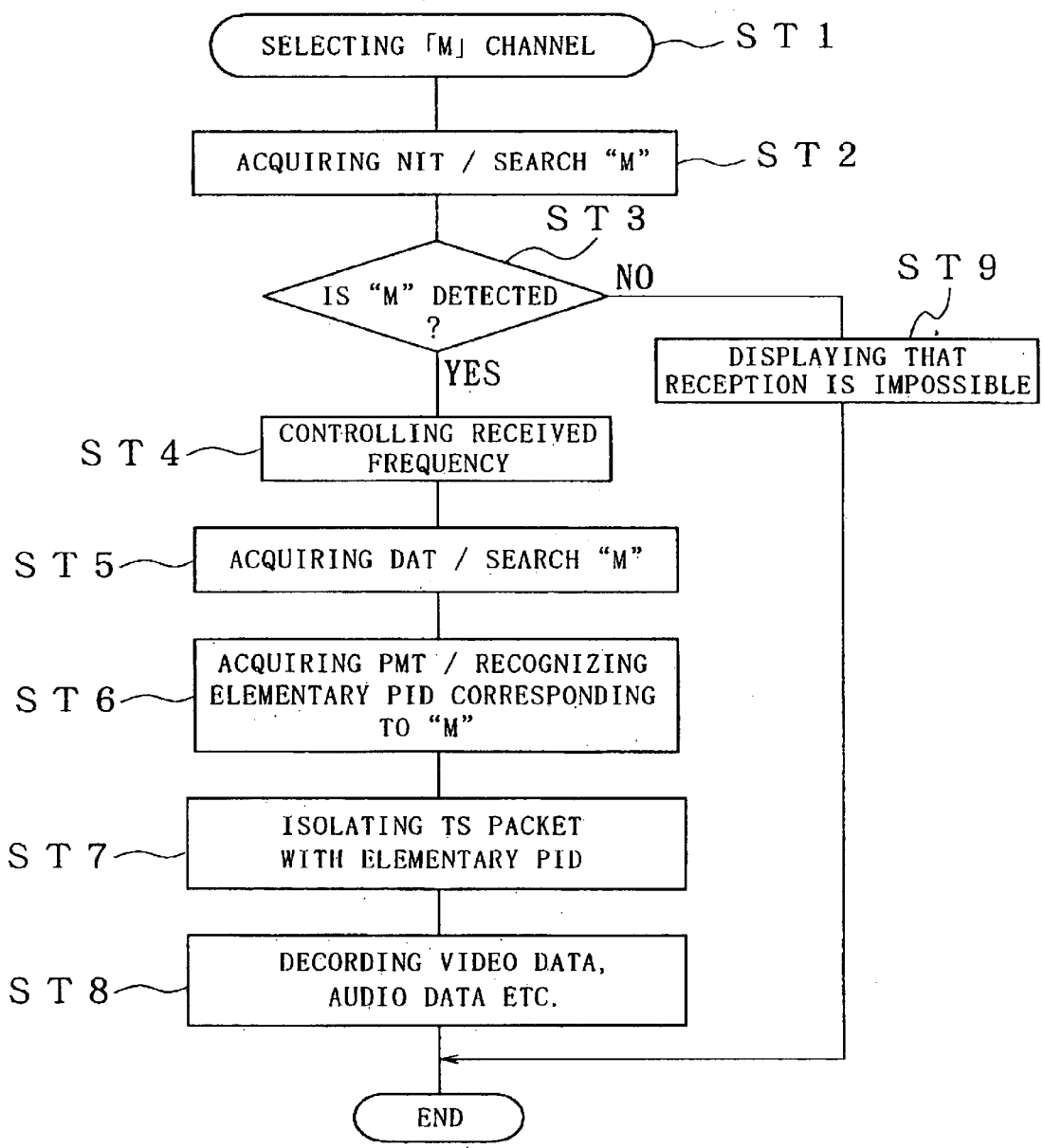
FIG. 15 is a flowchart for explaining the receiving operation of set top box (STB).

In the flowchart of FIG. 15, it has been explained that NIT is acquired in the step ST2 each time when the channel "M" is selected in the step ST1 and the channel "M" is searched using NIT, but it is also possible that NIT is acquired as required and it is then stored in the built-in memory of the controller 102 each time when content is changed and the channel "M" is searched using NIT. For instance, change of NIT content can be recognized with a version number.

Next, operations to be conducted when display of program guide information is instructed by the manipulation of the key input means 103 by a viewer will then be explained.

In this case, the controller 102 controls the demultiplexer 109 to acquire SDT and EIT as the EPG information by the fixed PID, controls OSD circuit 117 based on the SDT and EIT and causes this OSD circuit 117 to output the character display signal SCH for displaying the program guide information on the display screen. This character display signal SCH is combined with the video signals SV in the combiner 112 and is then guided to the output terminal 111. Therefore, a program guide information is displayed, on the display screen of monitor, over the image, for example, by the video signal SV.

Here, the controller 102 controls the demultiplexer 109 to acquire NIT and to display only the program guide information in relation to the service ID described in the service list descriptor of such NIT (it may be NIT stored in the built-in memory). Therefore, the service ID is described in the service list descriptor of NIT and only the program guide information in relation to the service (program) which can be received by the set top box 14 can be displayed.

As explained above, in this preferred embodiment, when the service (program) to be limited for viewing is designated, the service ID in relation to the service is deleted from NIT in the modulating conversion transmitting apparatus 12 (refer to FIG. 12). The service (program) in relation to the service ID deleted from NIT as explained above cannot be received by the set top box 14 even when it is the service (program) existing on the transmission route 13. Therefore, there is provided that limitation for viewing of a program can be realized easily and freely by the modulating conversion transmitting apparatus 12.

Moreover, in this embodiment, when the program guide information is instructed to be displayed, the OSD circuit 117 outputs the character display signal SCH for displaying the program guide information based on the EPG information in the set top box 14 to display the program guide information on the display screen of the monitor. In this case, the service ID is described in the service list descriptor of NIT and only the program guide information in relation to the service (program) which can be received by the set top box 14, is displayed. Accordingly, the program guide information in relation to the service (program) which cannot be received by the set top box 14, is never displayed and thereby confusion of viewers can be prevented.

The signal processing apparatus according to the present invention detects NIT of the digital broadcast data in the first network, deletes the information of program to be limited for viewing among the program information of NIT and acquires the digital broadcast data in the second network by replacing NIT of the digital broadcast data in the first network to the NIT from which the program information is deleted. In the receiving apparatus for receiving the predetermined program based on the program information of NIT, the program having no program information cannot be received. Accordingly, a program, even when it is existing on the transmission route, can be limited for viewing easily and freely by deleting the information of program to be limited for viewing among the program information of NIT as explained above.

Moreover, the receiving apparatus according to the present invention does not display the program guide information in relation to the program information not existing in NIT among the program guide information detected from the digital broadcast data. In this case, only the guide information of program which can be received is displayed on the display unit. Therefore, it does not occur that a program selected by a viewer on the basis of the program guide information cannot be received. Thereby, confusion of viewer can be prevented.

While the above is a complete description of the preferred embodiments of this invention, various alternatives, modifications and equivalents maybe used. Therefore, the above description should not be taken as limiting the scope of the invention as defined by the appended claims.

What is claimed is:

1. Signal processing apparatus for converting a first digital broadcast signal of a predetermined transmitting frequency on a first network to a second digital broadcast signal of the predetermined transmitting frequency on a second network, comprising:

first frequency converting means for obtaining a first digital modulated signal by frequency-converting said first digital broadcast signal;

demodulating means for obtaining digital broadcast data by demodulating said first digital modulated signal;

table detecting means for detecting a network information table, said table including transmitting frequency information corresponding to a predetermined satellite delivery system descriptor, and program guide information from the digital broadcast data transmitted from said demodulating means corresponding to a predetermined service list descriptor, said program guide information comprising a service table indicating channel information and an event information table indicating event information;

first table changing means for changing at least a transmitting frequency information of said network information table, representative of said predetermined transmitting frequency, detected by said table detecting means to a second transmitting frequency information, said information being applied to said second network;

second table changing means for automatically deleting program information, based upon an instruction received from said first network corresponding to a program to be limited for viewing on said second network, based upon predetermined customer premises equipment from said program information of the network information table detected by said table detecting means, and for inserting dummy data in place of the deleted program information;

table replacing means for replacing the network information table of the digital broadcast data transmitted from said demodulating means with the network information table automatically changed by said first and second table changing means;

modulating means for obtaining the second digital modulated signal by modulating the digital broadcast data in which the network information table is replaced by said table replacing means; and second frequency converting means for obtaining said second digital broadcast signal by frequency-converting said second digital modulated signal, wherein information in relation to said first digital broadcast signal not used in said program information of the network information table detected by said table detecting means is deleted.

2. Receiving apparatus comprising:

receiving means for receiving a second digital broadcast signal having a second predetermined frequency on a second network;

detecting means for detecting program guide information from said second digital broadcast signal;

wherein said second digital broadcast signal is converted from a first digital broadcast signal having a first predetermined frequency on a first network by a signal processing apparatus comprising first frequency converting means for obtaining a first digital modulated signal by frequency-converting said first digital broadcast signal, demodulating means for obtaining digital broadcast data by demodulating said first digital modulated signal, table detecting means for detecting a network information table, said table including transmitting frequency information corresponding to a predetermined satellite delivery system descriptor, and program guide information from the digital broadcast data transmitted from said demodulating means corresponding to a predetermined service list descriptor, said program guide information comprising a service table indicating channel information and an event information table indicating event information;

first table changing means for changing at least a transmitting frequency information of said network information table, representative of said predetermined transmitting frequency, detected by said table detecting means to a second transmitting frequency information, said information being applied to said second network;

second table changing means for automatically deleting program information, based upon an instruction received from said first network corresponding to a program to be limited for viewing on said second network, based upon predetermined customer premises equipment from said program information of the network information table detected by said table detecting means, and for inserting dummy data in place of the deleted program information;

table replacing means for replacing the network information table of the digital broadcast data transmitted from said demodulating means with the network information table automatically changed by said first and second table changing means, modulating means for obtaining the second digital modulated signal by modulating the digital broadcast data in which the network information table is replaced by said table replacing means, and second frequency converting means for obtaining said second digital broadcast signal by frequency-converting said second digital modulated signal, wherein information in relation to said first digital broadcast signal not used in said program information of the network information table detected by said table detecting means is deleted.

* * * * *